US012775649B2

(12) United States Patent
Lee et al.

(10) Patent No.: US 12,775,649 B2
(45) Date of Patent: Oct. 27, 2026

(54) DISPLAY DEVICE

(71) Applicant: LG ELECTRONICS INC., Seoul (KR)

(72) Inventors: Hyangjin Lee, Seoul (KR); Changmin Kwak, Seoul (KR); Jaekyung Lee, Seoul (KR); Daegun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/698,727

(22) PCT Filed: Oct. 25, 2021

(86) PCT No.: PCT/KR2021/015005
§ 371 (c)(1),
(2) Date: Apr. 4, 2024

(87) PCT Pub. No.: WO2023/074918
PCT Pub. Date: May 4, 2023

(65) Prior Publication Data
US 2024/0411792 A1 Dec. 12, 2024

(51) Int. Cl.
*G06F 16/334* (2025.01)
*G06F 3/16* (2006.01)
(Continued)

(52) U.S. Cl.
CPC .......... *G06F 16/3344* (2019.01); *G06F 3/167* (2013.01); *G06F 16/338* (2019.01); *G06F 40/30* (2020.01)

(58) Field of Classification Search
CPC .... G06F 16/3344; G06F 16/338; G06F 40/30; G06F 3/167
See application file for complete search history.

(56) References Cited

U.S. PATENT DOCUMENTS

2011/0246496 A1* 10/2011 Chung .................. G06F 16/951 707/766
2014/0025705 A1 1/2014 Barve et al.
(Continued)

FOREIGN PATENT DOCUMENTS

KR 1020140091375 7/2014
KR 1020150077580 7/2015
(Continued)

OTHER PUBLICATIONS

PCT International Application No. PCT/KR2021/015005, International Search Report dated Jul. 4, 2022, 2 pages.
(Continued)

*Primary Examiner* — Kavita Stanley
*Assistant Examiner* — Lin Lin M Htay
(74) *Attorney, Agent, or Firm* — LEE, HONG, DEGERMAN, KANG & WAIMEY

(57) ABSTRACT

The present disclosure provides a display device comprising: a voice acquisition unit having at least one microphone for acquiring user speech; and a processor for acquiring text data corresponding to the user speech, acquiring intention analysis results by performing intention analysis on the basis of the text data, determining whether the intention analysis is successful on the basis of the intention analysis results, searching for content metadata corresponding to the intention analysis results on the basis of the intention analysis results if the intention analysis is successful, and displaying, through a display unit, content search results corresponding to the user speech on the basis of the retrieved content metadata.

7 Claims, 10 Drawing Sheets

(51) Int. Cl.
*G06F 16/338* (2019.01)
*G06F 40/30* (2020.01)

(56) References Cited

U.S. PATENT DOCUMENTS

| | | | | |
|---|---|---|---|---|
| 2015/0067737 | A1 | 3/2015 | Li et al. | |
| 2016/0217522 | A1* | 7/2016 | Jnagal | G06Q 30/0627 |
| 2019/0279631 | A1* | 9/2019 | Naganuma | G06F 3/167 |
| 2020/0175981 | A1* | 6/2020 | Li | G10L 15/1815 |
| 2021/0073293 | A1* | 3/2021 | Fenton | H04L 51/08 |
| 2022/0172716 | A1* | 6/2022 | Yokoyama | G10L 15/22 |
| 2022/0374422 | A1* | 11/2022 | Shirakawa | G06F 16/248 |

FOREIGN PATENT DOCUMENTS

| | | |
|---|---|---|
| KR | 1020180071931 | 6/2018 |
| KR | 101873873 | 7/2018 |
| WO | 2020202862 | 10/2020 |

OTHER PUBLICATIONS

Korean Intellectual Property Office Application No. 10-2024-7014023, Office Action dated Jul. 23, 2026, 6 pages.

Evgeniy Gabrilovich and Shaul Markovitch, "Wikipedia-based Semantic Interpretation for Natural Language Processing", Journal of Artificial Intelligence Research 34 (2009), 56 pages.

* cited by examiner

DISPLAY DEVICE

CROSS-REFERENCE TO RELATED APPLICATION(S)

This application is the National Stage filing under 35 U.S.C. 371 of International Application No. PCT/KR2021/015005, filed on Oct. 25, 2021, the contents of which are all incorporated by reference herein in its entirety.

TECHNICAL FIELD

The present disclosure relates to a display device and a content search method capable of searching for content on the basis of user speech and displaying the content.

BACKGROUND ART

Recently, digital TV services using wired or wireless communication networks are becoming common. Digital TV services are capable of providing various services that could not be provided by the existing analog broadcasting services.

In addition, recently, the number of companies providing OTT (Over-the-top) services that provide content through wired or wireless communication networks is increasing, and the content provided is also becoming more diverse.

On the other hand, as voice recognition technology has recently developed, many display devices that allow users to search for content by uttering voices are being supplied.

However, when searching for content by using voice, there is a problem in that the user has to utter an exact program, character, or genre name.

In particular, when the user does not remember the exact program or character name and performs searching by combining an approximate story or background of the content, an existing voice recognition search system cannot process this and exposes incorrect search results to the user.

Therefore, there is an emerging need for technology that allows users to search for desired content even if the users make somewhat ambiguous speech.

DISCLOSURE OF INVENTION

Technical Problem

The problem to be solved by the present disclosure is to provide a display device capable of searching for content desired by a user and displaying search results even if the user makes an ambiguous speech that does not include words related to content metadata.

Technical Solution

A display device according to an embodiment of the present disclosure includes a voice acquisition unit having at least one microphone configured to acquire user speech, and a processor configured to acquire text data corresponding to the user speech, acquire an intention analysis result by performing intention analysis on the basis of the text data, determine whether the intention analysis is successful on the basis of the intention analysis result, search for content metadata corresponding to the intention analysis result on the basis of the basis of the intention analysis result if the intention analysis is successful, and display, through a display unit, content search result corresponding to the user speech on the basis of the retrieved content metadata.

Advantageous Effects

According to an embodiment of the present disclosure, a display device capable of searching for content desired by a user and displaying search results even if the user makes an ambiguous speech that does not include words related to content metadata.

BEST MODE FOR CARRYING OUT THE INVENTION

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

Figure 1:
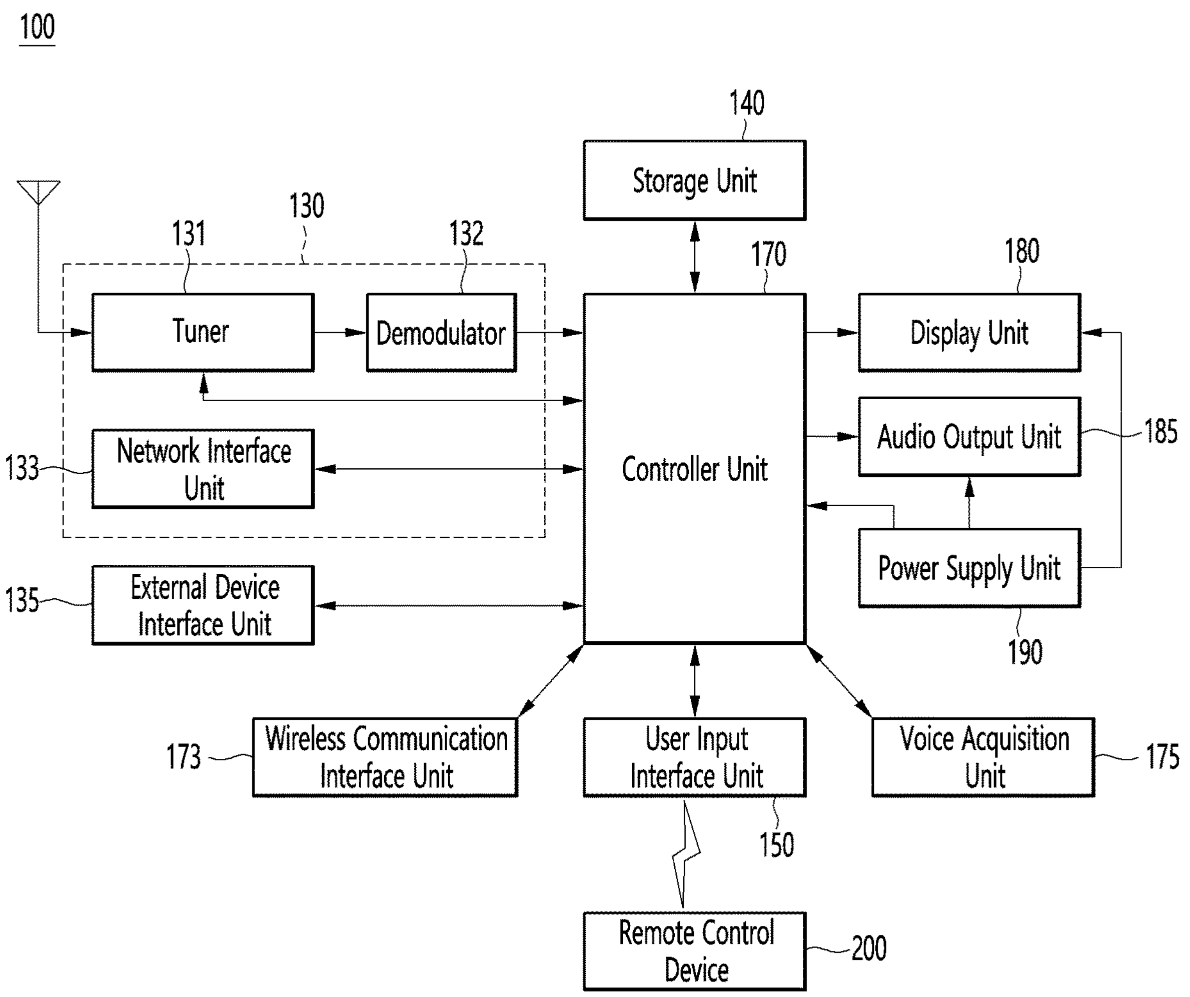
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception module 130, an external device interface unit 135, a storage unit 140, a user input unit 150, a control unit 170, a wireless communication interface unit 173, a display unit 180, an audio output unit 185, and a power supply unit 190.

The broadcast reception module 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program-related data signals, and may restore the divided video signals, audio signals, and data signals into an output available form.

The network interface 133 may provide an interface for connecting the display device 100 to a wired/wireless network comprising internet network. The network interface 133 may transmit or receive data to or from another user or another electronic device through an accessed network or another network linked to the accessed network.

The network interface unit 133 may access a predetermined webpage through an accessed network or another network linked to the accessed network. That is, the network interface unit 133 may transmit or receive data to or from a corresponding server by accessing a predetermined webpage through the network.

The network interface unit 133 may receive content or data provided from a content provider or a network operator. That is, the network interface unit 133 may receive content, such as movies, advertisements, games, VODs, and broadcast signals, which are provided from the content provider or the network operator, and information relating thereto through the network.

In addition, the network interface unit 133 may receive firmware update information and update files provided from the network operator, and may transmit data to the Internet or content provider or the network operator.

The network interface 133 may select and receive a desired application among applications open to the air, through network.

The external device interface unit 135 may receive an application or an application list in an adjacent external device and deliver the application or the application list to the control unit 170 or the storage unit 140.

The external device interface unit 135 may provide a connection path between the display device 100 and an external device. The external device interface unit 135 may receive at least one of an image or audio outputted from an external device that is wirelessly or wiredly connected to the display device 100 and deliver the received image or the audio to the controller. The external device interface unit 135 may include a plurality of external input terminals. The plurality of external input terminals may include an RGB terminal, at least one High Definition Multimedia Interface (HDMI) terminal, and a component terminal.

An image signal of an external device inputted through the external device interface unit 135 may be outputted through the display unit 180. A sound signal of an external device inputted through the external device interface unit 135 may be outputted through the audio output unit 185.

An external device connectable to the external device interface unit 135 may be one of a set-top box, a Blu-ray player, a DVD player, a game console, a sound bar, a smartphone, a PC, a USB Memory, and a home theater system but this is just exemplary.

Additionally, some content data stored in the display device 100 may be transmitted to a user or an electronic device, which is selected from other users or other electronic devices pre-registered in the display device 100.

The storage unit 140 may store signal-processed image, voice, or data signals stored by a program in order for each signal processing and control in the control unit 170.

In addition, the storage unit 140 may perform a function for temporarily storing image, voice, or data signals output from the external device interface unit 135 or the network interface unit 133, and may store information on a predetermined image through a channel memory function.

The storage unit 140 may store an application or an application list input from the external device interface unit 135 or the network interface unit 133.

The display device 100 may play content files (e.g., video files, still image files, music files, document files, application files, etc.) stored in the storage unit 140, and may provide the content files to a user.

The user input unit 150 may transmit signals input by a user to the control unit 170, or may transmit signals from the control unit 170 to a user. For example, the user input unit 150 may receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR communication methods.

In addition, the user input unit 150 may transmit, to the control unit 170, control signals input from local keys (not shown) such as a power key, a channel key, a volume key, and a setting key.

Image signals that are image-processed by the control unit 170 may be input to the display unit 180 and displayed as images corresponding to the image signals. In addition, image signals that are image-processed by the control unit 170 may be input to an external output device through the external device interface unit 135.

Voice signals processed by the control unit 170 may be output to the audio output unit 185. In addition, voice signals processed by the control unit 170 may be input to the external output device through the external device interface unit 135.

Additionally, the control unit 170 may control overall operations of the display device 100.

In addition, the control unit 170 may control the display device 100 by a user command or an internal program input through the user input unit 150, and may access the network to download a desired application or application list into the display device 100.

The control unit 170 may output channel information selected by a user together with the processed image or voice signals through the display unit 180 or the audio output unit 185.

In addition, the control unit 170 may output image signals or voice signals of an external device such as a camera or a camcorder, which are input through the external device interface unit 135, through the display unit 180 or the audio output unit 185, according to an external device image playback command received through the user input unit 150.

Moreover, the control unit 170 may control the display unit 180 to display images, and may control the display unit 180 to display broadcast images input through the tuner 131, external input images input through the external device interface unit 135, images input through the network interface unit, or images stored in the storage unit 140. In this case, an image displayed on the display unit 180 may be a still image or video and also may be a 2D image or a 3D image.

Additionally, the control unit 170 may play content stored in the display device 100, received broadcast content, and external input content input from the outside, and the content may be in various formats such as broadcast images, external input images, audio files, still images, accessed web screens, and document files.

Moreover, the wireless communication unit 173 may perform wired or wireless communication with an external device. The wireless communication unit 173 may perform short-range communication with an external device. For this, the wireless communication unit 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a wearable device capable of communication around the display device 100. Furthermore, if the detected wearable device is a device authenticated to communicate with the display device 100, the control unit 170 may transmit at least part of data processed in the display device 100 to the wearable device through the wireless communication unit 173. Therefore, a user of the wearable device may use the data processed by the display device 100 through the wearable device.

The voice acquisition unit 175 may acquire audio. The voice acquisition unit 175 may include at least one microphone (not shown) and may acquire audio around the display device 100 through the microphone (not shown).

The display unit 180 may convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 1, an image processing device such as the separated set-top box, and a content playback device including the display unit 180 and the audio output unit 185.

The audio output unit 185 receives the audio-processed signal from the control unit 170 to output an audio signal.

The power supply unit 190 supplies the corresponding power to the entire display device 100. Particularly, power may be supplied to the control unit 170 that is capable of being implemented in the form of a system on chip (SOC), the display unit 180 for displaying an image, the audio output unit 185 for outputting audio, and the like.

Specifically, the power supply unit 190 may include a converter that converts AC power to DC power and a DC/DC converter that converts a level of the DC power.

A remote control device according to an embodiment of the present disclosure will be described with reference to FIGS. 2 and 3.

Figure 2:
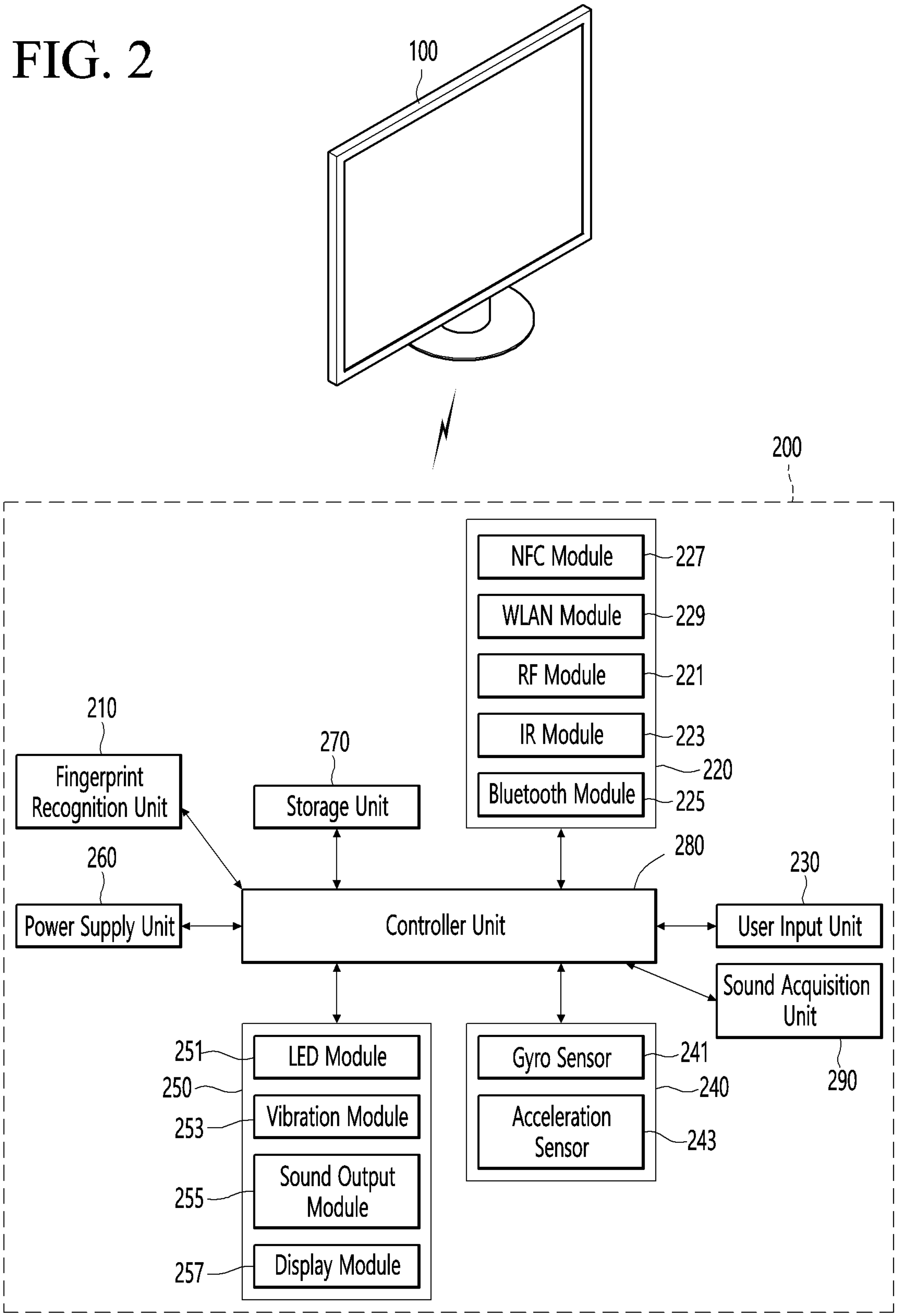
FIG. 2 is a block diagram illustrating a remote control device according to an embodiment of the present disclosure
Figure 3:
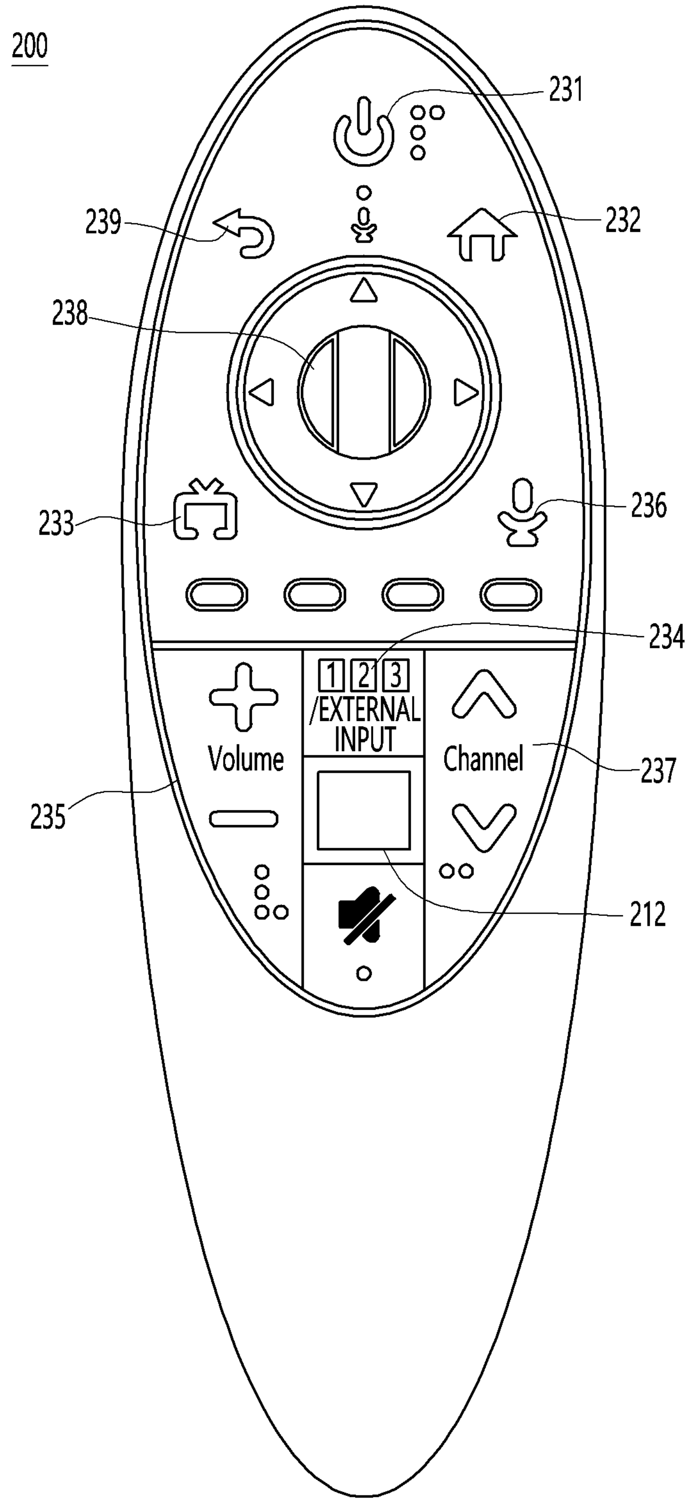
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 may include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 may include a Bluetooth module 225 capable of transmitting or receiving signals to or from the display device 100 according to a Bluetooth communication standard. In addition, the remote control device 200 may include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 may transmit signals containing information on the movement of the remote control device 200 to the display device 100 through the wireless communication unit 220.

Moreover, the remote control device 200 may receive signals transmitted from the display device 100 through the RF module 221 and if necessary, may transmit a command for power on/off, channel change, and volume change to the display device 100 through the IR module 223.

The user input unit 230 may be configured with a keypad, a button, a touch pad, or a touch screen. A user may operate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for controlling a volume output from the display device 100. The voice recognition button 236 may be a button for receiving user's voice and recognizing the received voice. The channel change button 237 may be a button for receiving broadcast signals of a specific broadcast channel. The OK button 238 may be a button for selecting a specific function, and the back button 239 may be a button for returning to a previous screen.

FIG. 2 is described again.

If the user input unit 230 includes a touch screen, a user may touch a soft key of the touch screen to input a command relating to the display device 100 to the remote control device 200. In addition, the user input unit 230 may include various kinds of input interfaces operable by a user, for example, a scroll key and a jog key, and this embodiment does not limit the scope of the present disclosure.

The sensor unit 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display unit 180 of the display device 100.

The output unit 250 may output image or voice signals in response to the operation of the user input unit 230, or may output image or voice signals corresponding to signals transmitted from the display device 100. A user may recognize whether the user input unit 230 is operated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste may be reduced. The power supply unit 260 may resume the supply of power if a predetermined key provided at the remote control device 200 is operated.

The storage unit 270 may store various kinds of programs and application data required to control or operate the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 may store, in the storage unit 270, information on a frequency band for transmitting/receiving signals to/from the display device 100 paired with the remote control device 200 and refer to it.

The control unit 280 controls general matters relating to the control of the remote control device 200. The control unit 280 may transmit a signal corresponding to a predetermined key operation of the user input unit 230 or a signal corresponding to the movement of the remote control device 200 sensed by the sensor unit 240 to the display device 100 through the wireless communication unit 220.

In addition, the sound acquisition unit 290 of the remote control device 200 may acquire voice.

The sound acquisition unit 290 may include at least one microphone and acquire voice through the microphone.

Figure 4:
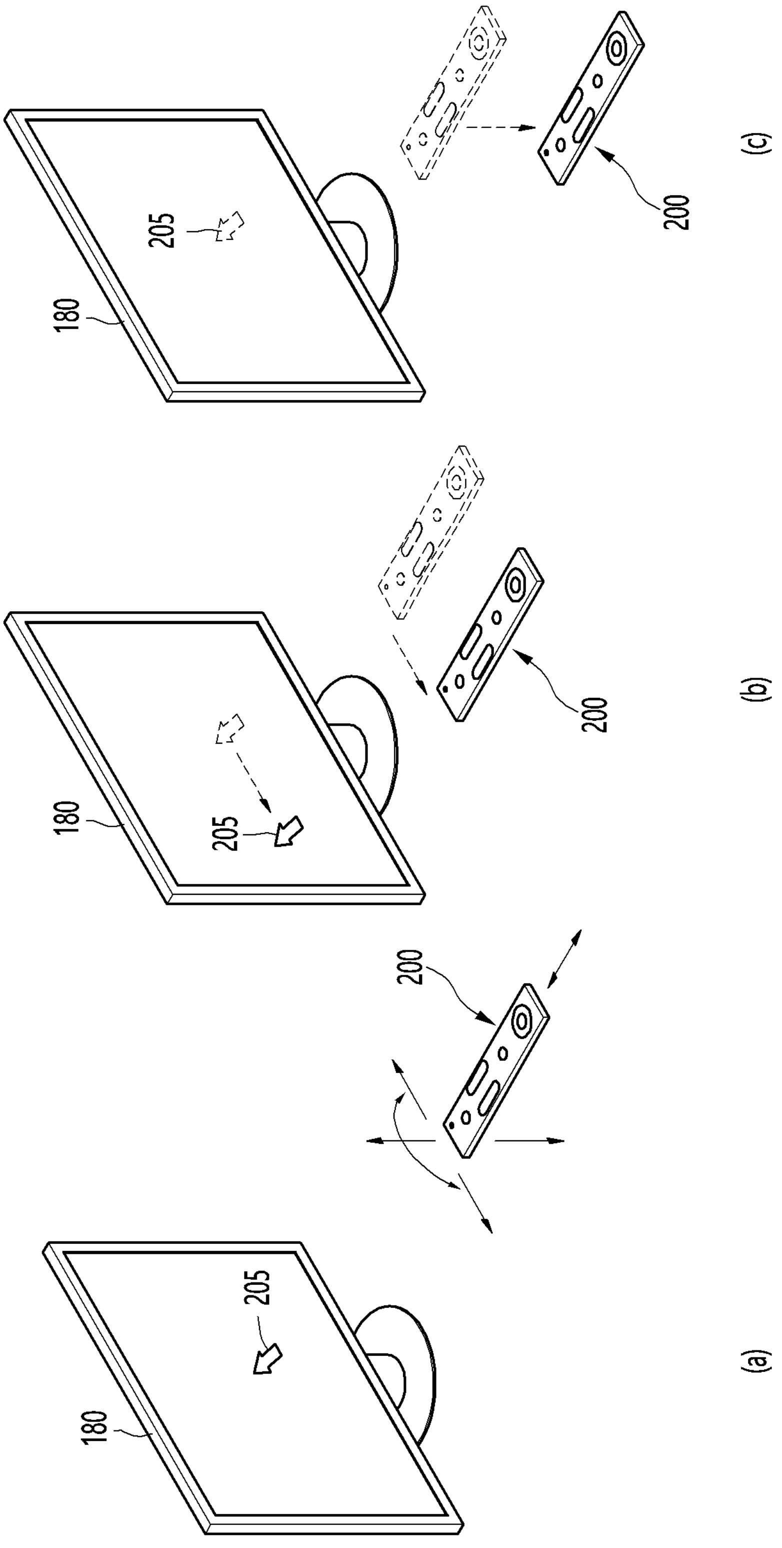
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4(*a*) illustrates that a pointer 205 corresponding to the remote control device 200 is displayed on the display unit 180.

A user may move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(*c*) illustrates that while a specific button in the remote control device 200 is pressed, a user moves the remote control device 200 away from the display unit 180. Thus, a selected region in the display unit 180 corresponding to the pointer 205 may be zoomed in and displayed in an enlarged size.

On the other hand, if a user moves the remote control device 200 close to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement cannot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display unit 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

On the other hand, the control unit 170 may also be referred to as a processor 170. The wireless communication unit 173 may also be referred to as a communication interface 173. Also, the storage unit 140 may also be referred to as a memory 140.

Figure 5:
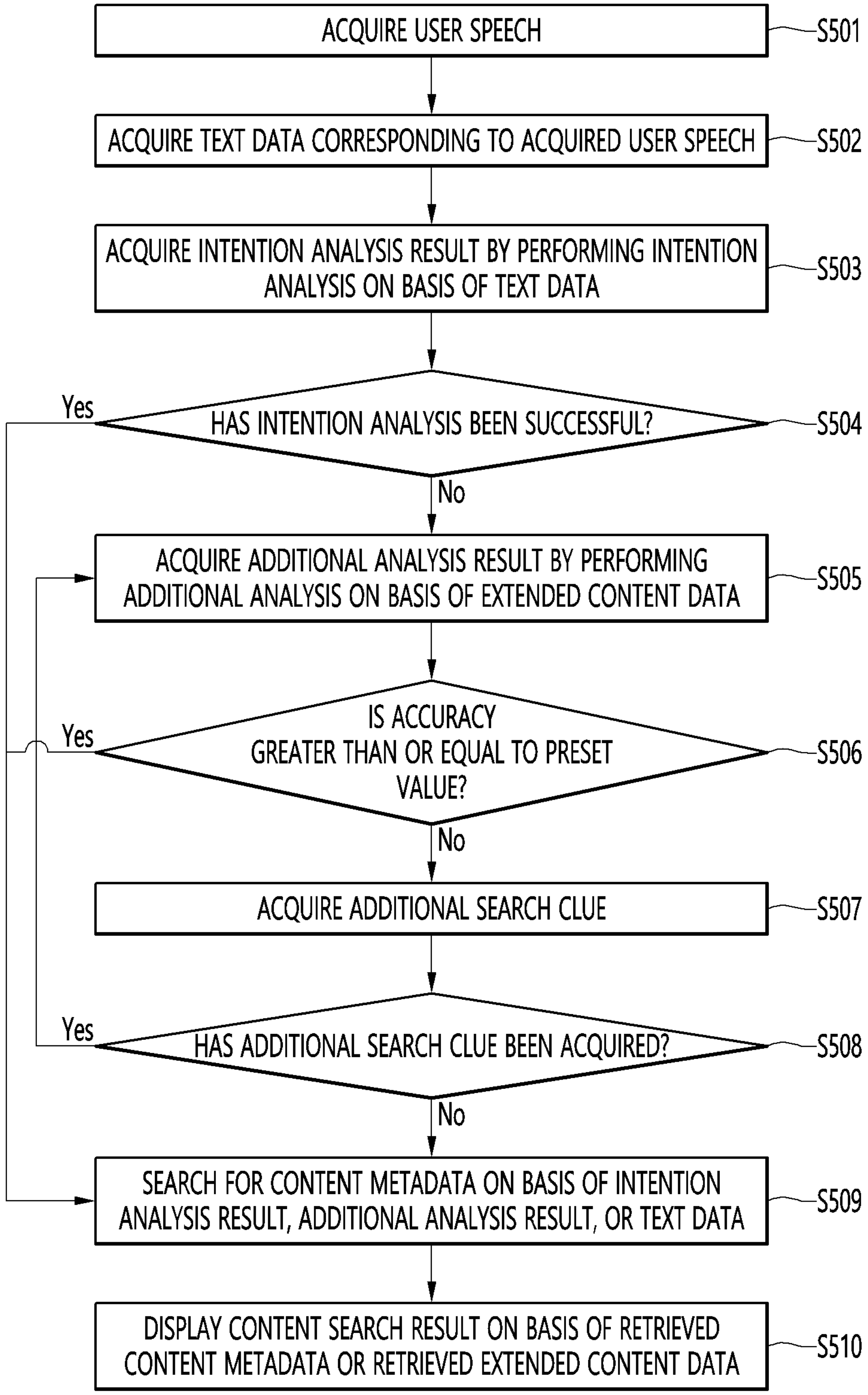
FIG. 5 is a flowchart for describing a content search method according to an embodiment of the present disclosure.

FIG. 5 is a flowchart for describing a content search method according to an embodiment of the present disclosure.

The processor 170 may acquire user speech through the voice acquisition unit 175 (S501). The voice acquisition unit 175 may include at least one microphone that acquires user speech.

The user speech may include a command for searching for content that the user wants to view on the display device 100. The user speech may be explicit user speech that includes words associated with content metadata. Additionally, the user speech may be ambiguous user speech that does not include words associated with content metadata.

The content metadata may include at least one of pieces of information about a content ID, a content genre, a content title, a content provider, a content director, a content actor, a content audience rating, and a content screening date.

On the other hand, the content metadata may be information provided from at least one content provider (CP).

For example, the processor 170 may receive at least one content metadata from each external server (not shown) operated by at least one content provider through the wireless communication unit 173.

On the other hand, the processor 170 may acquire text data corresponding to the acquired user speech (S502).

The processor 170 may acquire text data corresponding to the user speech by using a Speech To Text (STT) engine for converting voice input into a character string. In this case, the STT engine may include an artificial neural network trained according to a machine learning algorithm.

The processor 170 may input the acquired user speech to the STT engine and acquire text data corresponding to the user speech outputted from the STT engine.

On the other hand, the processor 170 may acquire an intention analysis result by performing intention analysis on the basis of the acquired text data (S503).

The processor 170 may perform intention analysis on the basis of text data and acquire an intention analysis result. The intention analysis may refer to acquiring an intention analysis result including keywords and classification information that serve as the basis for identifying the content that the user wants to search for from text data corresponding to the user speech.

In this case, the keywords may refer to words and phrases within text data, which may serve as the basis for analyzing the intention of the user's content search command.

Additionally, the classification information may be information about the corresponding classification in content metadata. The classification information may be classification information about each of a content ID, a content genre, a content title, a content provider, a content director, a content actor, a content viewing rating, and a content screening date of the content metadata.

On the other hand, the intention analysis model may be a natural language processing (NLP) engine for acquiring intention information of natural language. In this case, the intention analysis model may include an artificial neural network trained according to a machine learning algorithm. For example, the intention analysis model may be an artificial neural network trained to receive at least one text data as input data and output an intention analysis result including keywords including words or phrases, which serve as the basis for analyzing the intention of the content search command, and classification information for each of the keywords.

The processor 170 may input the text data to the intention analysis model and acquire the intention analysis result outputted from the intention analysis model and including at least one keyword and classification information for each of the at least one keyword.

Figure 6:
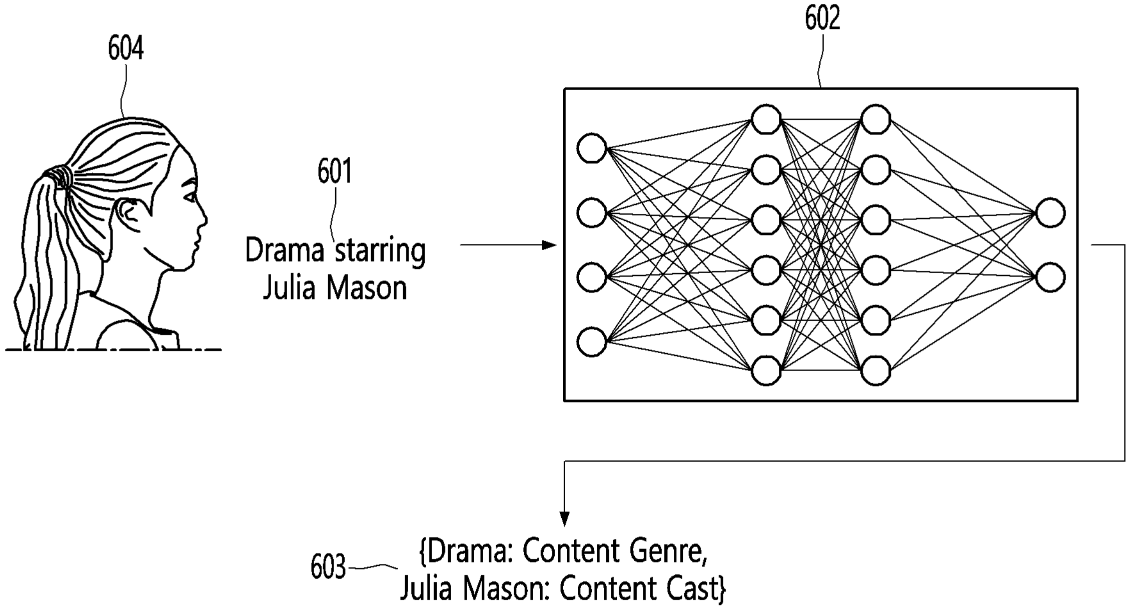
FIG. 6 is a view for describing an intention analysis model according to an embodiment of the present disclosure.

FIG. 6 is a view for describing an intention analysis model according to an embodiment of the present disclosure.

Referring to FIG. 6, the processor 170 may input, to an intention analysis model 602, text data 601 'Drama starring Julia Mason' corresponding to user speech uttered by a user 604. The processor 170 may input the text data 601 and acquire a first intention analysis result (603) outputted by the intention analysis model 602 and including keywords 'Drama' and 'Julia Mason' and classification information 'Content Genre' and 'Content Cast' for the keywords.

Figure 7:
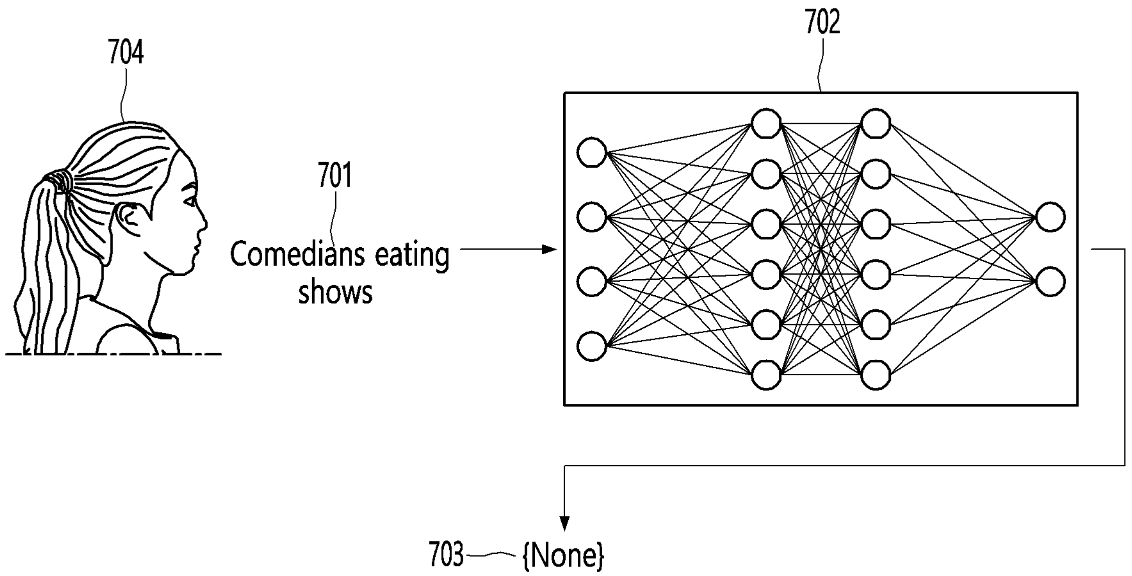
FIG. 7 is a view for describing an intention analysis model according to an embodiment of the present disclosure.

On the other hand, FIG. 7 is a view for describing an intention analysis model according to an embodiment of the present disclosure.

Referring to FIG. 7, the processor 170 may input, to an intention analysis model 702, text data 701 'Comedians eating shows' corresponding to user speech uttered by a user 704. On the other hand, in this case, the user speech is an ambiguous user speech that does not include words associated with content metadata. Accordingly, the processor 170 may acquire a failure result outputted from the intention analysis model 702 as a second intention analysis result 703. In this case, the intention analysis result, which is the failure result, may not include keywords and classification information corresponding to each of the keywords.

Referring again to FIG. 5, the processor 170 may determine whether the intention analysis has been successful on the basis of the intention analysis result (S504).

The processor 170 may determine whether the intention analysis has been successful on the basis of whether the intention analysis result includes at least one keyword and classification information corresponding to each of the at least one keyword.

For example, since the first intention analysis result 603 includes keywords 'Drama' and 'Julia Mason' and classification information 'Content Genre' and 'Content Cast' for the keywords, the processor 170 may determine that the intention analysis has been successful. Additionally, for example, the processor 170 may determine that the intention analysis has failed because the second intention analysis result 703 does not include at least one keyword and classification information corresponding to each of the at least one keyword.

On the other hand, if the intention analysis has been successful, the processor 170 may search for content metadata corresponding to the intention analysis result on the basis of the intention analysis result (S509).

The processor 170 may search for content metadata corresponding to the intention analysis result on the basis of each of at least one keyword and classification information included in the intention analysis result.

The processor 170 may search for at least one content metadata including information that completely or partially matches each of at least one keyword and classification information included in the intention analysis result.

For example, the processor 170 may search for content metadata that matches the keyword 'Drama' and the classification information 'Content Genre' included in the first intention analysis result 603. Additionally, the processor 170 may search for content metadata that matches the keyword 'Julia Mason' and the classification information 'Content Cast' included in the first intention analysis result 603. Additionally, the processor 170 may search for content metadata that matches the content keyword 'Julia Mason' and the classification information 'Content Cast' for each of at least one keyword included in the intention analysis result.

On the other hand, the processor 170 may display a content search result corresponding to user speech through the display unit 180 on the basis of the retrieved content metadata (S510).

On the other hand, the processor 170 may determine that the intention analysis has failed when at least one keyword is not included in the intention analysis result (504).

For example, if the user speech is an ambiguous user speech that does not include words associated with the content metadata, the intention analysis result may not include at least one keyword and classification information.

On the other hand, if the processor 170 determines that the intention analysis has not been successful, the processor 170 may acquire additional analysis results and accuracy by performing additional analysis on the basis of the extended content data.

The processor 170 may perform additional analysis on the basis of the extended content data.

The additional analysis may refer to extracting a search clue that serves as the basis for identifying the content that the user wants to search for from text data corresponding to the user speech, searching for extended content data on the basis of the extracted search clue, and acquiring an intention analysis result that includes information about the retrieved extended content data and accuracy.

The extended content data may include multilingual web-based free content encyclopedia data (e.g., Wikipedia) that is editable by anyone. The extended content data may include at least one extended content data. The extended content data may include data about a content title and content contents (background, plot, etc.). Accordingly, the processor 170 may attempt to search for content with respect to ambiguous user speech by using the extended content data.

On the other hand, the processor 170 may extract a search clue on the basis of text data, search for extended content data on the basis of the extracted search clue, acquire an additional analysis result including information about the retrieved extended content data and accuracy.

Figure 8:
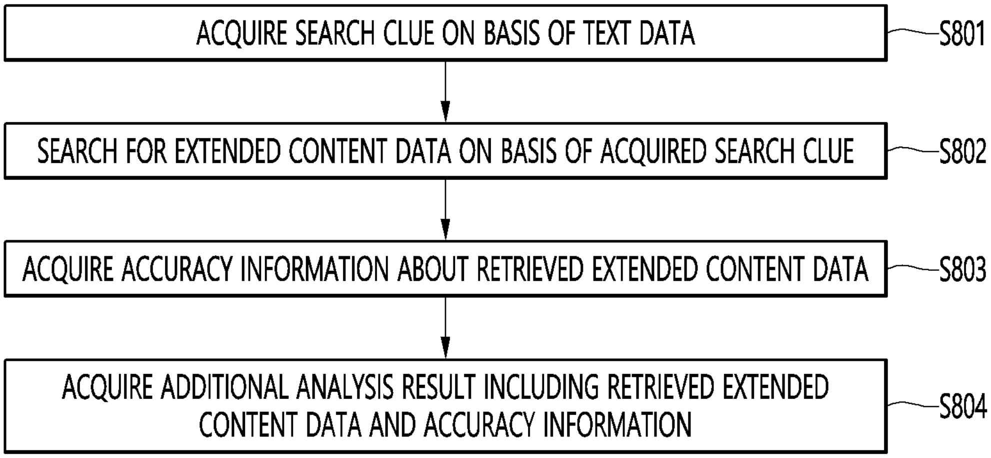
FIG. 8 is a flowchart for describing an additional analysis method according to an embodiment of the present disclosure.

FIG. 8 is a flowchart for describing an additional analysis method according to an embodiment of the present disclosure.

The processor 170 may acquire at least one search clue on the basis of text data corresponding to the user speech (S801).

The processor 170 may input the text data to a search clue extraction model and acquire a search clue outputted from the search clue extraction model.

The search clue may refer to words and phrases within text data, which may serve as the basis for analyzing the intention of the user's content search command.

On the other hand, the search clue extraction model may be an NLP engine for acquiring intention information of natural language. In this case, the search clue model may include an artificial neural network trained according to a machine learning algorithm. For example, the search clue extraction model may be an artificial neural network trained to receive at least one text data as input data and output a search clue including keywords including words or phrases that serve as the basis for analyzing the intention of the content search command keyword.

Figure 9:
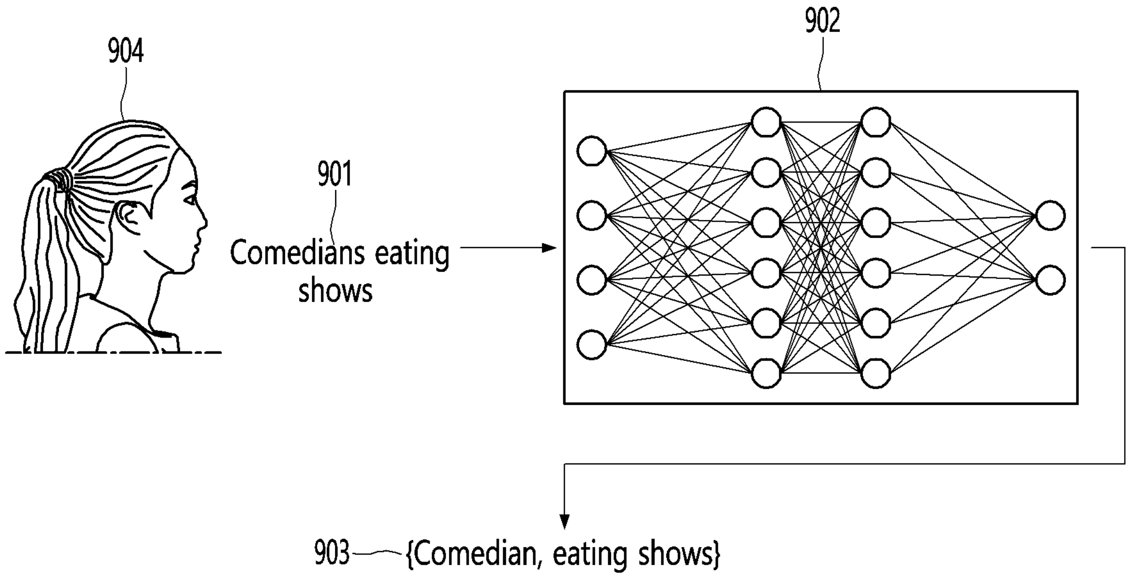
FIG. 9 is a view for describing a search clue extraction model according to an embodiment of the present disclosure.

FIG. 9 is a view for describing the search clue extraction model according to an embodiment of the present disclosure.

Referring to FIG. 9, the processor 170 may input, to the search clue extraction model 902, text data 901 'Comedians eating shows' corresponding to user speech uttered by a user 904. The processor 170 may input the text data 901 and acquire a search clue 'Comedian' and 'eating shows' 903 outputted by the search clue extraction model 902.

Referring again to FIG. 8, the processor 170 may search for extended content data on the basis of at least one acquired search clue (S802).

The processor 170 may search for extended content data on the basis of at least one search clue.

The processor 170 may acquire extended content data in which at least one search clue is searched for from among a plurality of extended content data. For example, the processor 170 may search for at least one extended content data in which 'Comedian' and 'eating shows' of the search clue 903 of FIG. 9 include content contents.

On the other hand, the processor 170 may acquire accuracy information about the retrieved extended content data (S803).

The processor 170 may acquire accuracy information on the basis of the frequency with which the search clue is searched for in the retrieved extended content data. For example, the processor 170 may determine that as the frequency with which the search clue is searched for in the retrieved extended content data increases, the accuracy increases. The processor 170 may determine that as the frequency with which the search clue is searched for in the retrieved extended content data decreases, the accuracy decreases.

On the other hand, the processor 170 may acquire an additional analysis result including the retrieved extended content data and the accuracy information about the retrieved extended content data (S804).

Referring again to FIG. 5, the processor 170 may determine whether the accuracy of the retrieved extended content data is greater than or equal to a preset value on the basis of the accuracy information included in the additional analysis result (S506).

For example, due to the high frequency with which the search clue is searched for in the retrieved extended content data, the accuracy of the retrieved extended content data may be greater than a preset value.

In addition, for example, due to the low frequency with which the search clue is searched for in the retrieved extended content data, the accuracy of the retrieved extended content data may be less than a preset value.

On the other hand, if the accuracy of the retrieved extended content data is greater than or equal to the preset value, the processor 170 may search for content metadata on the basis of the additional analysis result (S509).

The processor 170 may search for content metadata on the basis of the retrieved extended content data included in the additional analysis result.

For example, the processor 170 may search for content metadata including content title information that matches the content title of the retrieved extended content data included in the additional analysis result.

For example, if the content title of the retrieved extended content data included in the additional analysis result is 'Delicious people', the processor 170 may search for content metadata whose content title is 'Delicious people'.

On the other hand, the processor 170 may display a content search result through the display unit 180 on the basis of the retrieved content metadata or the retrieved extended content data (S510).

The processor 170 may display the content search result including the retrieved extended content data or the retrieved content metadata on the display unit 180 through a search result interface.

Figure 10:
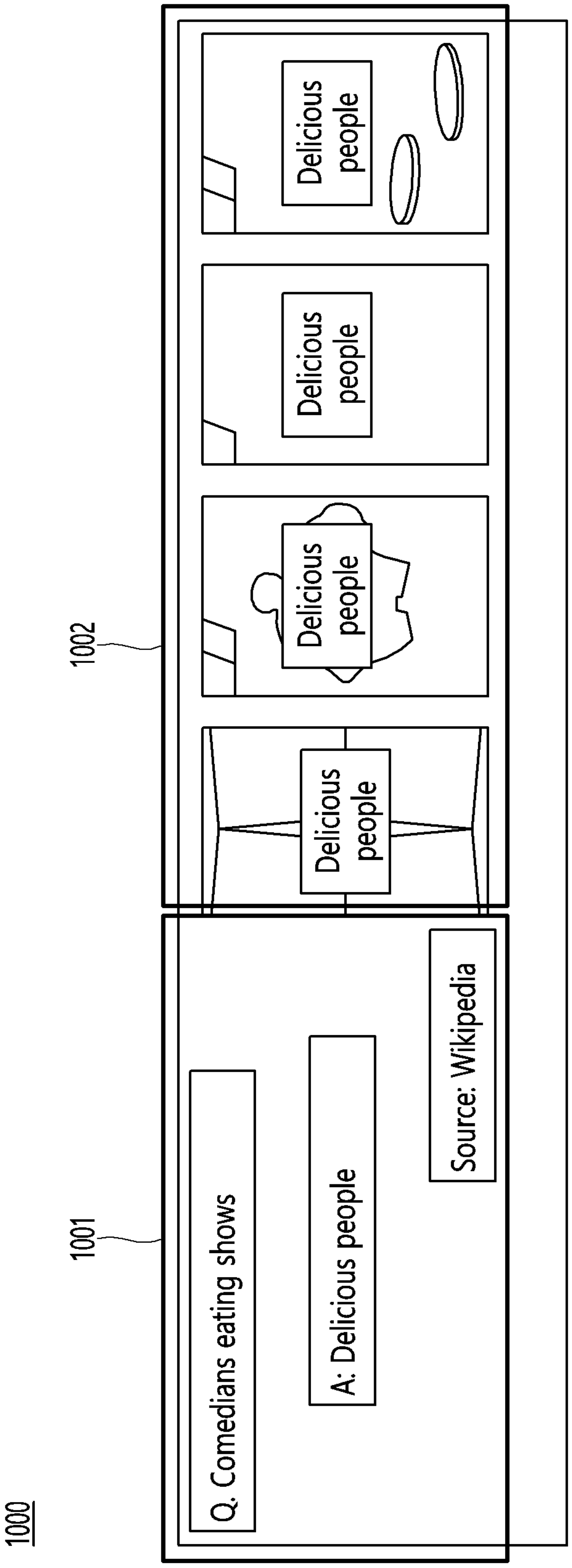
FIG. 10 is a view for describing a search result interface according to an embodiment of the present disclosure.

FIG. 10 is a view for describing the search result interface according to an embodiment of the present disclosure.

The search result interface 100 may include a search result including retrieved extended content data 1001 or retrieved content metadata 1002 and may be displayed on the display unit 180.

When the processor 170 receives a user's selection for the retrieved extended content data 1001 through the search result interface 1000, the processor 170 may display detailed information about the content title and content contents of the retrieved extended content data.

Additionally, when the processor 170 receives a user's selection for the retrieved content metadata 1001 through the search result interface 1000, the processor 170 may display content related to the retrieved content metadata.

Referring again to FIG. 5, the processor 170 may acquire an additional search clue when the accuracy of the retrieved extended content data is less than a preset value (S507).

The processor 170 may acquire synonyms for each of at least one search clue as an additional search word.

For example, if a first search cue is 'Comedian' and a second search cue is 'eating shows', the processor 170 may acquire 'Mukbang', a synonym of the second search clue, as an additional search clue.

On the other hand, the processor 170 may determine whether the additional search clue has been acquired (S508).

If the additional search clue is acquired, the processor 170 may use the additional search word as the search clue and acquire an additional analysis result by performing additional analysis on the basis of the extended content data (S505).

On the other hand, if the additional search clue is not acquired, the processor 170 may search for content metadata on the basis of the text data itself (S509).

In this case, content metadata associated with the text data may be requested by transmitting text data to an external content provider server, and content metadata may be acquired from the external content provider server.

The above description is merely illustrative of the technical spirit of the present disclosure, and various modifications and changes can be made by those of ordinary skill in the art, without departing from the scope of the present disclosure.

Therefore, the embodiments disclosed in the present disclosure are not intended to limit the technical spirit of the present disclosure, but are intended to explain the technical spirit of the present disclosure. The scope of the technical spirit of the present disclosure is not limited by these embodiments.

The scope of the present disclosure should be interpreted by the appended claims, and all technical ideas within the scope equivalent thereto should be construed as falling within the scope of the present disclosure.

The invention claimed is:

1. A display device comprising:

a voice acquisition unit having at least one microphone configured to acquire user speech; and a processor configured to:

acquire text data corresponding to the user speech, acquire an intention analysis result by inputting the text data to an intention analysis model configured to output a result of intention analysis, determine whether the intention analysis is successful based on whether the intention analysis result includes at least one keyword and classification information corresponding to each of the at least one keyword, wherein the keyword includes a word or a phrase that serves as a basis for analyzing intention of a user's content search command within the text data and the classification information includes classification information about at least one of a content genre, a content title, or a content actor of a content metadata, based on the intention analysis being successful, search for content metadata corresponding to the intention analysis result from an external content provider server using the intention analysis result, based on the intention analysis being unsuccessful, perform additional analysis by acquiring at least one search clue based on the text data corresponding to the user speech by inputting the text data to a search clue extraction model configured to extract and output search clues based on input text, searching for extended content data based on the acquired at least one search clue, and acquiring accuracy of the extended content data based on a frequency at which the at least one search clue appears in other searches for the extended content data, based on the accuracy being less than a preset value, performing additional analysis again by acquiring another at least one search clue based on the text data corresponding to the user speech by inputting the text data to the search clue extraction model and searching for another extended content data based on the another at least one search clue and acquiring accuracy information of the another extended content data, and based on the accuracy being greater than or equal to a preset value, searching for content metadata from the external content provider server using the extended content data, display, through a display unit, content search result corresponding to the user speech based on the content metadata obtained using the intention analysis result or the extended content data.

2. The display device of claim 1, wherein:

the intention analysis model includes an artificial neural network trained according to a machine learning algorithm.

3. The display device of claim 1, wherein the extended content data includes multilingual web-based encyclopedia data.

4. The display device of claim 1, wherein the processor is further configured to, based on the accuracy information being greater than or equal to a preset value:

display, through the display unit, a content search result based on the content metadata or the extended content data.

5. The display device of claim 4, wherein:

the content search result is displayed through a search result interface, and the processor is further configured to:

display detailed information including a content title and contents of the extended content data in response to a user selection of the extended content data through the search result interface; and display content associated with the content metadata in response to a user selection of the content metadata through the search result interface.

6. The display device of claim 1, wherein the additional search clue includes a synonym for each of the at least one search clue.

7. The display device of claim 1, wherein the processor is configured to, based on the accuracy information being less than a preset value, request at least one content metadata associated with the text data from the external content provider server.

* * * * *